United States Patent
Sawada et al.

(10) Patent No.: US 8,240,130 B2
(45) Date of Patent: Aug. 14, 2012

(54) ABNORMALITY DIAGNOSIS APPARATUS FOR EXHAUST PURIFICATION SYSTEM

(75) Inventors: Hiroshi Sawada, Gotenba (JP); Daisuke Shibata, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 506 days.

(21) Appl. No.: 12/594,753

(22) PCT Filed: Nov. 14, 2008

(86) PCT No.: PCT/JP2008/070787
§ 371 (c)(1),
(2), (4) Date: Oct. 5, 2009

(87) PCT Pub. No.: WO2009/063981
PCT Pub. Date: May 22, 2009

(65) Prior Publication Data
US 2010/0115918 A1 May 13, 2010

(30) Foreign Application Priority Data
Nov. 16, 2007 (JP) ................. 2007-298456

(51) Int. Cl.
| F01N 3/00 | (2006.01) |
| F01N 3/10 | (2006.01) |
| F02B 77/08 | (2006.01) |
| F02D 17/04 | (2006.01) |
| F02M 63/02 | (2006.01) |

(52) U.S. Cl. ............... 60/277; 60/276; 60/285; 60/295; 60/301; 123/198 DB

(58) Field of Classification Search ............ 60/276, 60/277, 285, 295, 301, 303; 123/332, 394; 123/198 DB; 701/86
See application file for complete search history.

(56) References Cited

U.S. PATENT DOCUMENTS
| 2001/0014298 A1 | 8/2001 | Neufert | |
| 2007/0079601 A1* | 4/2007 | Hirata et al. | 60/286 |
| 2007/0240405 A1* | 10/2007 | Nishina et al. | 60/286 |

FOREIGN PATENT DOCUMENTS
| JP | 2001 20724 | 1/2001 |
| JP | 2001 234736 | 8/2001 |
| JP | 2002 525478 | 8/2002 |
| JP | 2005 83223 | 3/2005 |
| JP | 2006 132442 | 5/2006 |
| JP | 2007 32537 | 2/2007 |
| WO | WO 00/17493 | 3/2000 |

* cited by examiner

OTHER PUBLICATIONS

Extended European Search Report issued Oct. 26, 2010, in Patent Application No. 08848643.6.

*Primary Examiner* — Thomas Denion
*Assistant Examiner* — Audrey K Bradley
(74) *Attorney, Agent, or Firm* — Oblon, Spivak, McClelland, Maier & Neustadt, L.L.P.

(57) ABSTRACT

In an exhaust purification system having a urea addition device adding a urea aqueous solution to an NOx catalyst of selective reduction type provided in an exhaust passage in an internal combustion engine, a sensor detecting an ammonia concentration is provided at the downstream side of the NOx catalyst. During fuel cut, a predetermined amount of urea aqueous solution is added. Then, based on a sensor output obtained at this time, an abnormality in at least one of the urea addition device and the urea aqueous solution is detected. The addition of the urea aqueous solution during the fuel cut prevents reactive consumption between urea and NOx. The sensor output corresponding to the amount of the urea aqueous solution is obtained. This output condition is compared with a normal one to allow determination of whether or not an appropriate amount of urea aqueous solution of appropriate quality has been added.

5 Claims, 6 Drawing Sheets

ABNORMALITY DIAGNOSIS APPARATUS FOR EXHAUST PURIFICATION SYSTEM

TECHNICAL FIELD

The present invention relates to an abnormality diagnosis apparatus for an exhaust purification system, and in particular, to an abnormality diagnosis apparatus for an exhaust purification system that adds a urea aqueous solution to an NOx catalyst of selective reduction type to reduce and remove NOx in exhaust gas (what is called a urea SCR system).

BACKGROUND ART

In general, as an exhaust purification apparatus located in an exhaust system for an internal combustion engine such as a diesel engine, an NOx catalyst is known which is used to purify NOx (nitrogen oxide) contained in exhaust gas. Various types of NOx catalysts are known. Among these NOx catalysts, an NOx catalyst of selective reduction type is well known to which a reducing agent is added to continuously reduce and remove NOx. As a reducing agent, urea is commonly used in the form of a water solution. A urea aqueous solution is injected and fed into exhaust gas present on the upstream side of the catalyst. Then, the urea aqueous solution receives heat from the exhaust and the catalyst and is thus hydrolyzed to generate ammonia. The ammonia reacts with NOx on the NOx catalyst, causing the NOx to be decomposed into $N_2$ and $H_2O$.

In an exhaust purification system using the NOx catalyst of selective reduction type, if the urea aqueous solution fails to be appropriately added to the NOx catalyst, exhaust emission may be degraded. Thus, desirably, the urea addition system is appropriately diagnosed for abnormalities. If an abnormality is detected, the user is immediately notified of the abnormality to take appropriate measures such as repair. In particular, in the field of automobiles, regulations in many countries require that abnormalities that may degrade the exhaust gas be detected onboard so that the driver can be warned of the abnormalities.

In connection with conventional abnormality diagnoses for urea addition systems, for example, Japanese Patent Application Laid-Open No. 2005-83223 manages the concentration of a urea aqueous solution by providing a concentration detection device that detects the concentration of the urea aqueous solution, in a tank in which the urea aqueous solution is stored.

Abnormalities in the urea addition system which may degrade the exhaust emission include an addition amount abnormality in which the urea addition amount deviates from a preset value and a quality abnormality in which the properties (particularly the concentration) of the urea aqueous solution deviate from preset ones. The former may occur when an abnormality occurs in the urea addition device itself, for example, a urea injection valve becomes defective. The latter may occur when, for example, a urea aqueous solution other than a specified one or plain water is refilled into a urea aqueous solution tank. In any case, in terms of prevention of degradation of the exhaust emission, both abnormalities can desirably be detected. Furthermore, when at least one of the abnormalities is detected, the user is desirably warned of the abnormality. In this connection, the technique described in Japanese Patent Application Laid-Open No. 2005-83223 can detect the abnormality in the concentration of the urea aqueous solution but not the addition amount abnormality.

Furthermore, in connection with the abnormality in the quality of the urea aqueous solution, such a urea aqueous solution concentration detection device as described in Japanese Patent Application Laid-Open No. 2005-83223 is generally expensive and thus unsuitable for being mounted in a vehicle. Furthermore, the provision of the urea aqueous solution concentration detection device means the addition of the new device. This complicates the configuration of the apparatus and increases costs.

DISCLOSURE OF THE INVENTION

The present invention has been made in view of the above-described circumstances. An object of the present invention is to provide an abnormality diagnosis apparatus for an exhaust purification system which enables abnormalities in a urea addition system in a urea SCR system to be suitably and easily detected.

The present invention provides an abnormality diagnosis apparatus for an exhaust purification system characterized by comprising:

an NOx catalyst of selective reduction type provided in an exhaust passage in an internal combustion engine;

a urea addition device adding a urea aqueous solution to the NOx catalyst;

a sensor detecting an ammonia concentration of exhaust gas at a downstream side of the NOx catalyst;

fuel cut means for performing fuel cut in the internal combustion engine; and abnormality detection means for detecting an abnormality in at least one of the urea addition device and the urea aqueous solution based on an output from the sensor obtained when the urea addition device adds a predetermined amount of urea aqueous solution during the fuel cut performed by the fuel cut means.

During the fuel cut, exhaust gas containing no NOx (the gas is substantially air) passes through the NOx catalyst. In this condition, the addition of the predetermined amount of urea aqueous solution allows all of the urea aqueous solution to be hydrolyzed into ammonia in the NOx catalyst. The ammonia flows out from the NOx catalyst and is then sensed by the sensor. That is, with NOx removed from the exhaust gas, the addition of the predetermined amount of urea aqueous solution results in a sensor output corresponding to the amount of the urea aqueous solution, with reactive consumption of urea with NOx prevented. This output condition is compared with a previously experimentally determined normal output condition. This enables determination of whether or not an appropriate amount of urea aqueous solution of an appropriate quality has been added. Consequently, an abnormality in at least one of the urea addition device and the urea aqueous solution can be suitably detected.

Preferably, the sensor comprises an NOx sensor capable of detecting both NOx concentration and ammonia concentration of the exhaust gas.

In the exhaust purification system with the NOx catalyst of selective reduction type, in many cases, an NOx sensor is provided at the downstream side of the NOx catalyst in order to control the amount of urea added to the NOx catalyst. In this preferred embodiment, the NOx sensor can be utilized for abnormality diagnosis. Thus, the abnormality diagnosis can be performed using the simple configuration without the need to add a new device.

Preferably, the abnormality detection means detects an abnormality in at least one of the urea addition device and the urea aqueous solution based on at least one of a peak value and an integrated value of the sensor output.

For example, when the amount of urea added is excessively larger than an intended value or the urea concentration of the urea aqueous solution is excessively higher than an intended value, the peak value or integrated value of the sensor output becomes larger than a predetermined value. Thus, evaluating at least one of the peak value and integrated value of the sensor output allows abnormalities in at least one of the urea addition device and the urea aqueous solution to be detected.

Preferably, the apparatus comprises another abnormality detection means for detecting an abnormality only in the urea addition device. The above-described abnormality detection means determines that an abnormality is occurring in the urea aqueous solution when the another abnormality detection device has detected no abnormality in the urea addition device and when an output condition of the sensor is within a predetermined abnormality range.

The abnormality diagnosis apparatus can detect abnormalities in the urea addition system as a whole but has difficulty distinguishably identifying an abnormality in the urea addition device and an abnormality in the urea aqueous solution, that is, an abnormality in the addition amount of the urea aqueous solution and an abnormality in the quality of the urea aqueous solution. Thus, the provision of the another abnormality detection device detecting an abnormality only in the urea addition device allows an abnormality in the urea aqueous solution to be determined when no abnormality is detected in the urea addition device and when the output condition of the sensor is within the predetermined abnormality range. Thus, the different abnormalities can be distinguished from each other, thus further improving diagnosis accuracy.

Preferably, the urea addition device comprises a urea addition valve ejecting the urea aqueous solution into the exhaust passage. The another abnormality detection means comprises a pressure sensor detecting pressure of the urea aqueous solution supplied to the urea addition valve. The another abnormality detection means determines that an abnormality is occurring in the urea addition device when a decrease in urea aqueous solution pressure detected by the pressure sensor during ejection of the urea aqueous solution by the urea addition valve is within a predetermined abnormality range.

When the urea aqueous solution is ejected from the urea addition valve, the supply pressure of the urea aqueous solution correspondingly decreases. Thus, an abnormality only in the urea addition device can be detected by allowing the pressure sensor to detect the decrease in the supply pressure of the urea aqueous solution and comparing the decrease with a decrease in a normal condition.

The present invention exerts an excellent effect of allowing abnormalities in the urea addition system of the urea SCR system to be suitably and easily detected.

BEST MODE FOR CARRYING OUT THE INVENTION

The best mode for carrying out the present invention will be described with reference to the accompanying drawings.

Figure 1:
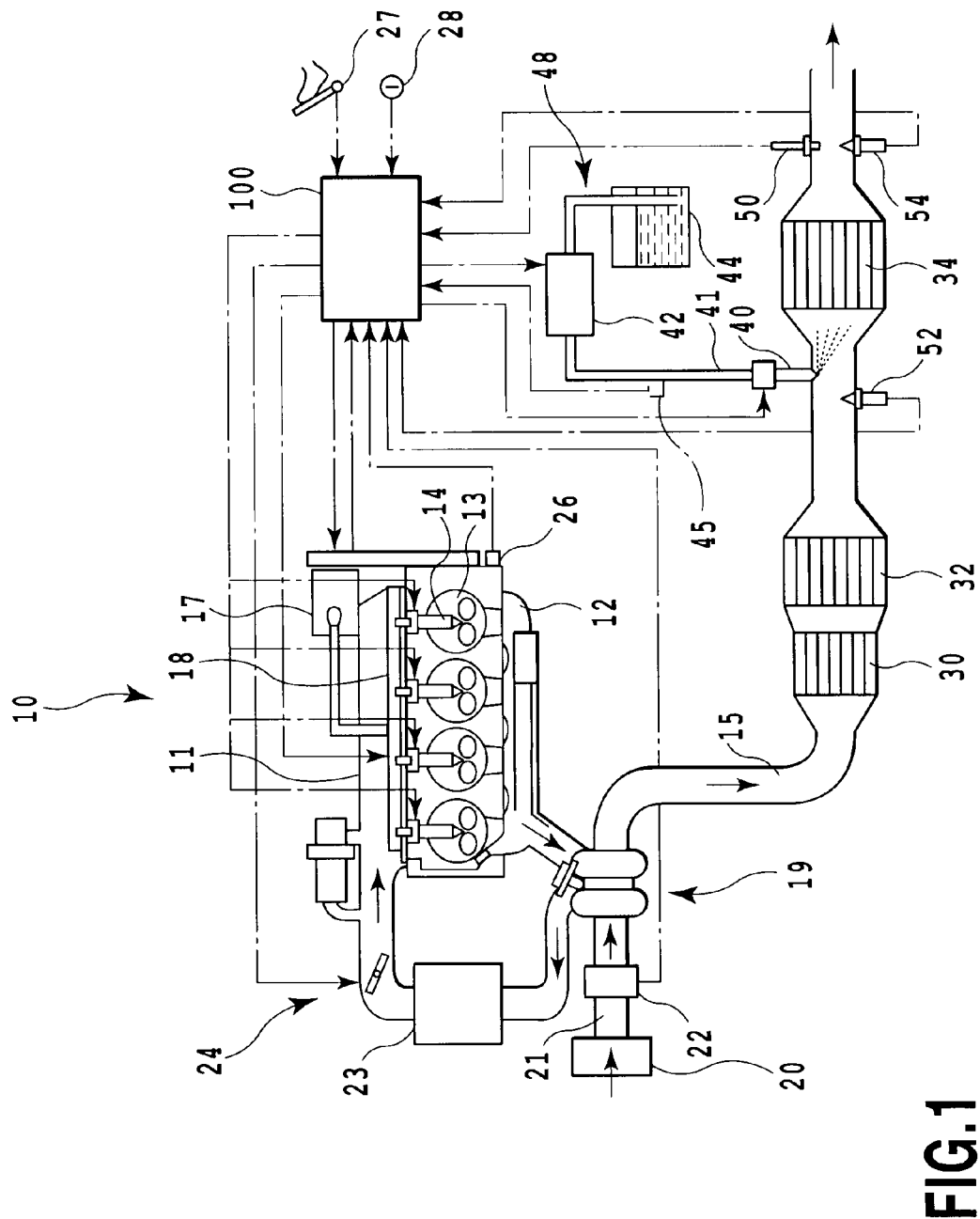
FIG. 1 is a schematic system diagram of an internal combustion engine according to an embodiment of the present invention.

FIG. 1 is a schematic system diagram of an internal combustion engine according to an embodiment of the present invention. In the figure, reference numeral 10 denotes a compression ignition type internal combustion engine, that is, a diesel engine, and reference 11 denotes an intake manifold that is in communication with an intake port. Reference numeral 12 denotes an exhaust manifold that is in communication with an exhaust port, and reference numeral 13 denotes a combustion chamber. In the present embodiment, fuel fed from a fuel tank (not shown in the drawings) to a high pressure pump 17 is fed to a common rail 18 under pressure by the high pressure pump 17. The fuel is then stored under a high pressure. The high-pressure fuel in the common rail 18 is injected and fed from an injector 14 directly into the combustion chamber 13. Exhaust gas from the engine 10 is fed from the exhaust manifold 12 through a turbo charger 19 to an exhaust passage 15 located downstream of the turbo charger 19. The exhaust gas is then subjected to a purification treatment as described below. The purified exhaust gas is then discharged to the atmosphere. The configuration of the diesel engine is not limited to the one including the common rail type fuel injection device. Furthermore, the diesel engine may optionally include another exhaust purification device such as an EGR device.

On the other hand, intake air introduced into the intake passage 21 through an air cleaner 20 passes through an air flow meter 22, the turbo charger 19, an intercooler 23, and a throttle valve 24 in this order. The intake air then reaches the intake manifold 11. The air flow meter 22 is a sensor that senses the amount of the intake air. Specifically, the air flow meter 22 outputs a signal corresponding to the flow rate of the intake air. The throttle valve 24 adopted is of an electronic control type.

An oxidation catalyst 30, a DPR (Diesel Particulate Reduction) catalyst 32, and an NOx catalyst, particularly an NOx catalyst of selective reduction type 34 are provided in the exhaust passage 15 in series in this order from upstream side to downstream side; the oxidation catalyst 30 oxidizes and purifies an unburnt component (particularly HC) in the exhaust gas, the DPR catalyst 32 collects particulate matter (PM) present in the exhaust gas and combusts and removes the particulate matter, and the NOx catalyst 34 reduces and purifies NOx present in the exhaust gas.

A urea addition device 48 is provided to add a urea aqueous solution to the NOx catalyst 34 as a reducing agent. Specifically, a urea addition valve 40 allowing the urea aqueous solution to be ejected is provided in the exhaust passage 15 at the downstream side of the DPR catalyst 32 and at the upstream side of the NOx catalyst 34. The urea addition valve 40 is supplied with the urea aqueous solution from a urea supply pump 42 through a supply line 41. The urea supply pump 42 sucks and discharges the urea aqueous solution stored in a urea tank 44.

Furthermore, an electronic control unit (hereinafter referred to as an ECU) is provided which serves as control means for controlling the engine as a whole. The ECU 100 includes a CPU, a ROM, a RAM, an I/O port, and a storage device. The ECU 100 controls an injector 14, the high-pressure pump 17, the throttle valve 24, and the like. Furthermore, the ECU 100 controls the urea addition valve 40 and the urea supply pump 42 so as to control the urea addition amount. Sensors connected to the ECU 100 include, in addition to the above-described air flow meter 22, an NOx sensor, that is, a post-catalyst NOx sensor 50 provided at the downstream side of the NOx catalyst 34, and a pre-catalyst exhaust temperature sensor 52 and a post-catalyst exhaust temperature sensor 54 provided at the upstream side and downstream side, respectively, of the NOx catalyst 34. The pre-catalyst exhaust temperature sensor 52 is installed in the exhaust passage 15 at the downstream side and of the DPR catalyst 32 and at the upstream side of the NOx catalyst 34.

The post-catalyst NOx sensor 50 provides an output signal of a magnitude proportional to the NOx concentration and ammonia concentration of the exhaust gas. In particular, the post-catalyst NOx sensor 50 can detect not only the NOx in the exhaust gas but also ammonia ($NH_3$) in the exhaust gas. The post-catalyst NOx sensor 50 is what is called a limiting current type NOx sensor. The post-catalyst NOx sensor 50 internally decomposes the NOx (particularly NO) in the exhaust gas into $N_2$ and $O_2$. Based on the $O_2$, oxygen ions migrate between electrodes. Thus, the post-catalyst NOx sensor 50 outputs a current output proportional to the amount of the oxygen ions. On the other hand, the post-catalyst NOx sensor 50 internally decomposes $NH_3$ in the exhaust gas into NO and $H_2O$ and further decomposes the NO into $N_2$ and $O_2$. Then, based on a principle similar to that for NOx, the post-catalyst NOx sensor 50 generates a current output. The post-catalyst NOx sensor 50 provides an output proportional to the total of the NOx concentration and the ammonia concentration. The post-catalyst NOx sensor 50 cannot distinguish the NOx concentration from the ammonia concentration.

As other sensors, a crank angle sensor 26, an accelerator angle sensor 27, and an engine switch 28 are connected to the ECU 100. During rotation of a crank angle, the crank angle sensor 26 outputs a crank pulse signal to the ECU 100. Based on the crank pulse signal, the ECU 100 detects the crank angle of the engine 10, and calculates the rotation speed of the engine 10. The accelerator angle sensor 27 outputs, to the ECU 100, a signal corresponding to the angle (accelerator angle) of an accelerator pedal operated by the user. The engine switch 28 is turned on to start the engine and turned off to stop the engine.

Examples of the NOx catalyst of selective reduction type (SCR: Selective Catalytic Reduction) 34 include a catalyst including a base material such as zeolite or alumina carrying noble metal such as Pt on the surface thereof, a catalyst having transition metal such as Cu carried on the base material surface as a result of ion exchange, and a catalyst composed of a titania/vanadium catalyst ($V_2O_5/WO_3/TiO_2$) carried on the base material surface. The NOx catalyst of selective reduction type 34 reduces and purifies NOx when temperature of it is within an active temperature region and the urea as reducing agent is added to the catalyst. Addition of urea to the catalyst allows ammonia to be generated on the catalyst. The ammonia reacts with NOx, which is thus reduced.

The temperature of the NOx catalyst 34 can be detected directly by a temperature sensor buried in the catalyst. However, the present embodiment estimates the temperature. Specifically, the ECU 100 estimates the temperature of the catalyst based on a pre-catalyst exhaust temperature and a post-catalyst exhaust temperature detected by the pre-catalyst exhaust temperature sensor 52 and the post-catalyst exhaust temperature sensor 54, respectively. The estimation method is not limited to such an example.

The amount of urea added to the NOx catalyst 34 is controlled based on a post-catalyst NOx concentration detected by the post-catalyst NOx sensor 50. Specifically, the amount of urea ejected from the urea addition valve 40 is controlled so that the detection value of the post-catalyst NOx concentration is always zero. In this case, the urea ejection amount may be set based only on the detection value of the post-catalyst NOx concentration. Alternatively, a basic urea ejection amount may be set so as to zero the post-catalyst NOx concentration, based on an engine operation condition (for example, the engine rotation speed and the accelerator angle), and subjected to feedback control based on the detection value from the post-catalyst NOx sensor 50. Since the NOx catalyst 34 enables NOx to be reduced only when urea is added to the catalyst, urea is normally constantly added to the catalyst. Furthermore, control is performed such that only a minimum amount of urea required for NOx reduction is added. Addition of an excessively large amount of urea causes ammonia to be discharged to the downstream side of the catalyst (what is called $NH_3$ slip). This may cause a foul small.

Here, the minimum amount of urea required to reduce a total amount of NOx discharged from the engine is defined as A. The amount of actually added urea is defined as B. The ratio B/A is called an equivalent ratio. The addition of urea is controlled such that the equivalent ratio becomes as close to 1 as possible. However, the operation condition of the engine actually varies constantly. Consequently, the actual equivalent ratio is not necessarily zero. If the equivalent ratio is smaller than 1, the urea supply amount is insufficient, and NOx is discharged to the downstream side of the catalyst. The post-catalyst NOx sensor 50 thus detects this to allow the urea supply amount to be increased. If the equivalent ratio is larger than 1, the urea supply amount is excessively large. The added urea may attach to the NOx catalyst 34. In this case, even after the addition of urea is stopped, the attached urea allows NOx to be reduced for a while.

Furthermore, whether the addition of urea is executed or stopped is controlled depending on the catalyst temperature (in the present embodiment, an estimated value) of the NOx catalyst 34. Specifically, when the catalyst temperature is equal to or higher than a predetermined minimum active temperature (for example, 200° C.), the addition of urea is executed. When the catalyst temperature is lower than the minimum active temperature, the addition of urea is stopped. This is because before the catalyst temperature reaches the minimum active temperature, the addition of urea fails to allow NOx to be efficiently reduced. Furthermore, when the catalyst temperature reaches a predetermined upper limit temperature (for example, 400° C.) higher than the minimum active temperature, the addition of urea is stopped. This is also because the addition of urea fails to allow NOx to be efficiently reduced. Of course, in general, the diesel engine involves a lower exhaust temperature than gasoline engines. The catalyst temperature relatively infrequently reaches such an upper limit temperature. Eventually, the addition of urea is executed when the catalyst temperature is equal to or higher than the minimum active temperature and lower than the upper limit temperature and stopped when the catalyst temperature is outside this temperature region.

Moreover, the ECU 100 indirectly detects the element temperature of the post-catalyst NOx sensor 50 based on the element impedance thereof. The ECU 100 thus determines whether or not the detected element temperature is inside a predetermined active region. The post-catalyst NOx sensor 50 detects the NOx concentration (and the ammonia concentration described below) when the element temperature is inside the active region and avoids such detection when the element temperature is outside the active region.

In the present embodiment, the oxidation catalyst 30, the DPR catalyst 32, and the NOx catalyst 34 are arranged in this order from upstream side to downstream side. However, an order of arrangement is not limited to this aspect. The DPR catalyst 32 is a kind of diesel particulate filter (DPF). The DPR catalyst 32 has a filter structure and includes noble metal on the surface thereof. The DPR catalyst 32 is of a continuous recycling type in which particulate matter collected by the filter is continuously oxidized (burnt) by utilizing the noble metal. The DPR is not limited to the DPR catalyst 32, but any type of DPR may be used. An embodiment may be provided in which at least one of the oxidation catalyst 30 and the DPR catalyst 32 is omitted.

Now, the abnormality diagnosis for the urea addition system will be described.

In the present embodiment, abnormality detection means is provided which detects abnormalities in the urea addition system, that is, abnormalities in at least one of the urea addition device 48 and the urea aqueous solution. That is, when an abnormality occurs in the urea addition device 48, the urea addition amount becomes excessively larger or smaller than the optimum amount. This precludes desired urea addition control. Such an abnormality in urea addition amount occurs when, for example, urea addition valve 40 or the supply line 41 is clogged to reduce the urea supply amount or when the urea supply pump 42 becomes defective to cause an excessive increase or reduction in the supply pressure of the urea aqueous solution, thus increasing or reducing the urea addition amount. On the other hand, when an abnormality occurs in the urea aqueous solution, that is, an abnormality in the quality (particularly the concentration) of the urea aqueous solution, for example, the amount of urea supplied to the NOx catalyst 34 during the same amount of time when the urea addition valve 40 is open may become excessively large or insufficient, thus precluding the desired urea addition control. For example, if the concentration of the urea aqueous solution is lower than a predetermined value (for example, 32.5%), the urea addition amount during the same amount of valve open time for the urea addition valve 40 decreases. In contrast, if the concentration of the urea aqueous solution is higher than the predetermined value, the urea addition amount during the same amount of valve open time for the urea addition valve 40 increases. Such an abnormality in the quality of the urea aqueous solution occurs when a urea aqueous solution other than a specified one is refilled or when plain water is refilled instead of the urea aqueous solution. All of these abnormalities may degrade the exhaust emission. Thus, the present embodiment detects any of the abnormalities immediately after the abnormality occurs.

The abnormality diagnosis according to the present embodiment is performed while fuel cut is being carried out with the injection of fuel into the engine 10 stopped. During the fuel cut, the urea addition device 48 adds a predetermined amount of urea aqueous solution. Then, based on an output from the post-catalyst NOx sensor 50 corresponding to the addition, an abnormality in at least one of the urea addition device 48 and the urea aqueous solution is detected.

During the fuel cut, exhaust gas containing no NOx (the gas is substantially air) passes through the NOx catalyst 34. In this condition, the addition of the predetermined amount of urea aqueous solution allows all of the urea aqueous solution to be hydrolyzed into ammonia in the NOx catalyst 34. The ammonia flows out from the NOx catalyst 34 and is then sensed by the post-catalyst NOx sensor 50. That is, with NOx removed from the exhaust gas, the addition of the predetermined amount of urea aqueous solution results in an output from the post-catalyst NOx sensor 50 corresponding to the amount of the urea aqueous solution, with reactive consumption of urea with NOx prevented. This output condition is compared with a previously experimentally determined normal output condition. This enables determination of whether or not an appropriate amount of urea aqueous solution of an appropriate quality has been added. Consequently, an abnormality in at least one of the urea addition device 48 and the urea aqueous solution can be suitably detected.

Furthermore, the post-catalyst NOx sensor 50 detects the concentration of the ammonia in the gas discharged to the downstream side of the NOx catalyst 34. Thus, the post-catalyst NOx sensor 50, originally used to control the urea addition amount, can be utilized for the abnormality diagnosis. Consequently, the abnormality diagnosis can be performed using the simple configuration without the need to add a new device. Since the diagnosis is performed utilizing execution timings for the fuel cut, relatively frequently performed during the actual traveling of the vehicle, the appropriate frequency of the diagnosis can be easily ensured.

Figure 2:
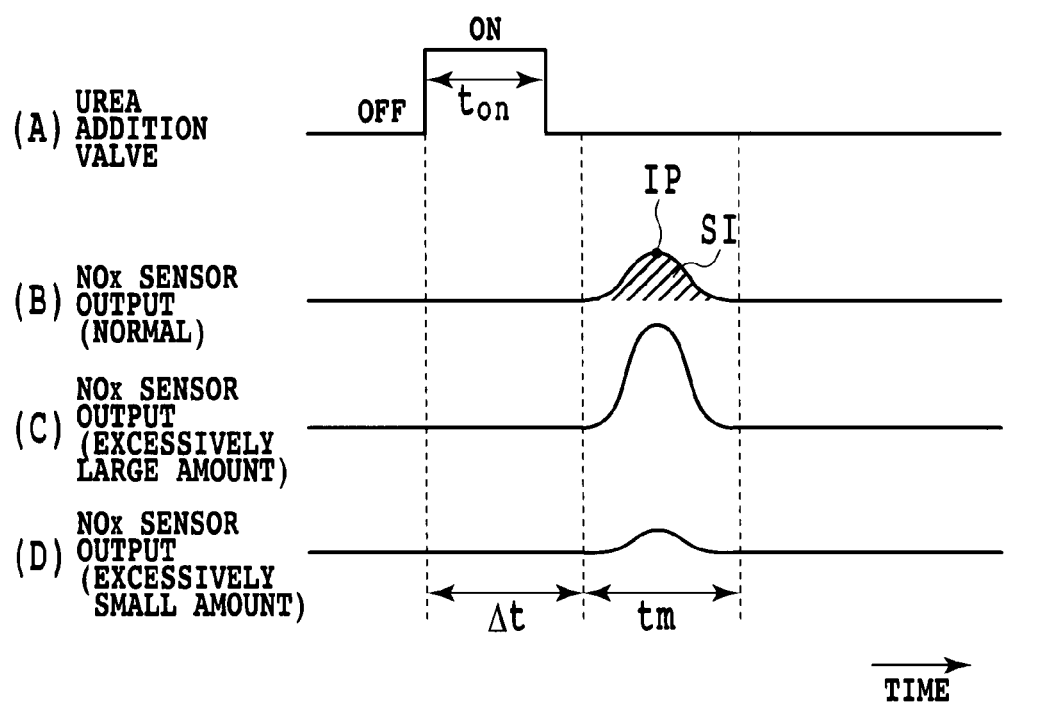
FIG. 2 is a time chart showing corresponding outputs from a post-catalyst NOx sensor obtained when a urea addition valve is turned on during fuel cut.

FIG. 2 shows corresponding outputs from the post-catalyst NOx sensor 50 obtained when the urea addition valve 40 is turned on during fuel cut. As shown in (A), when the urea addition valve 40 remains on (valve open) for a given time, the urea aqueous solution is ejected from the urea addition valve 40. After a while, the output from the post-catalyst NOx sensor 50 starts to rise. The appropriate and normal output condition of the NOx sensor for the given on time is as shown in (B). In contrast, the output condition as shown in (C) indicates an excessively large amount. On the contrary, the output condition as shown in (D) indicates an excessively small amount. The excessively large output as shown in (C) is expected to be because the concentration of the urea aqueous solution is excessively high or the amount of the urea aqueous solution is excessively large. On the other hand, the excessively small output as shown in (D) is expected to be because the concentration of the urea aqueous solution is excessively low or the amount of the urea aqueous solution is excessively small. Thus, if the excessively large and small outputs as shown in (C) and (D), respectively, are actually obtained, it is determined that an abnormality is occurring in at least one of the urea addition device 48 and the urea aqueous solution.

The actually obtained output condition can be compared with the normal output condition as shown in (B), for example, as follows. In one method, the peak value of the normal output (shown by Ip in FIG. 2) is experimentally determined. A normal range is set for the peak value. Then, when the peak value of the actual output is within the normal range, it is determined that no abnormality is occurring. When the peak value of the actual output is out of the normal range (within the abnormality range), it is determined that an abnormality is occurring. In an alternative method, the integrated value (corresponding to an area shown by SI in FIG. 2) of the normal output for every micro time is experimentally determined. A normal range is set for the output integrated value. When the actual output integrated value is within the normal range, it is determined that no abnormality is occurring. When the actual output integrated value is out of the normal range (within the abnormality range), it is determined that an abnormality is occurring. Any other comparison method is possible.

As shown in FIG. 2, the output from the post-catalyst NOx sensor 50 corresponding to the addition of urea appears a predetermined time $\Delta t$ after the turn-on of the urea addition valve 40. This is because the time is required for a series of processes in which the urea aqueous solution ejected from the urea addition valve 40 reaches the NOx catalyst 34, where the urea aqueous solution is hydrolyzed into ammonia, part of which is adsorbed onto the NOx catalyst 34, and the changed or adsorbed ammonia then reaches the post-catalyst NOx sensor 50, which reacts to the ammonia. Thus, in order to minimize the adverse effect of noise or the like, which is irrelevant to the addition of urea, the sensor output is suitably monitored from when the predetermined time $\Delta t$ has passed from the turn-on of the urea addition valve 40.

Figure 3:
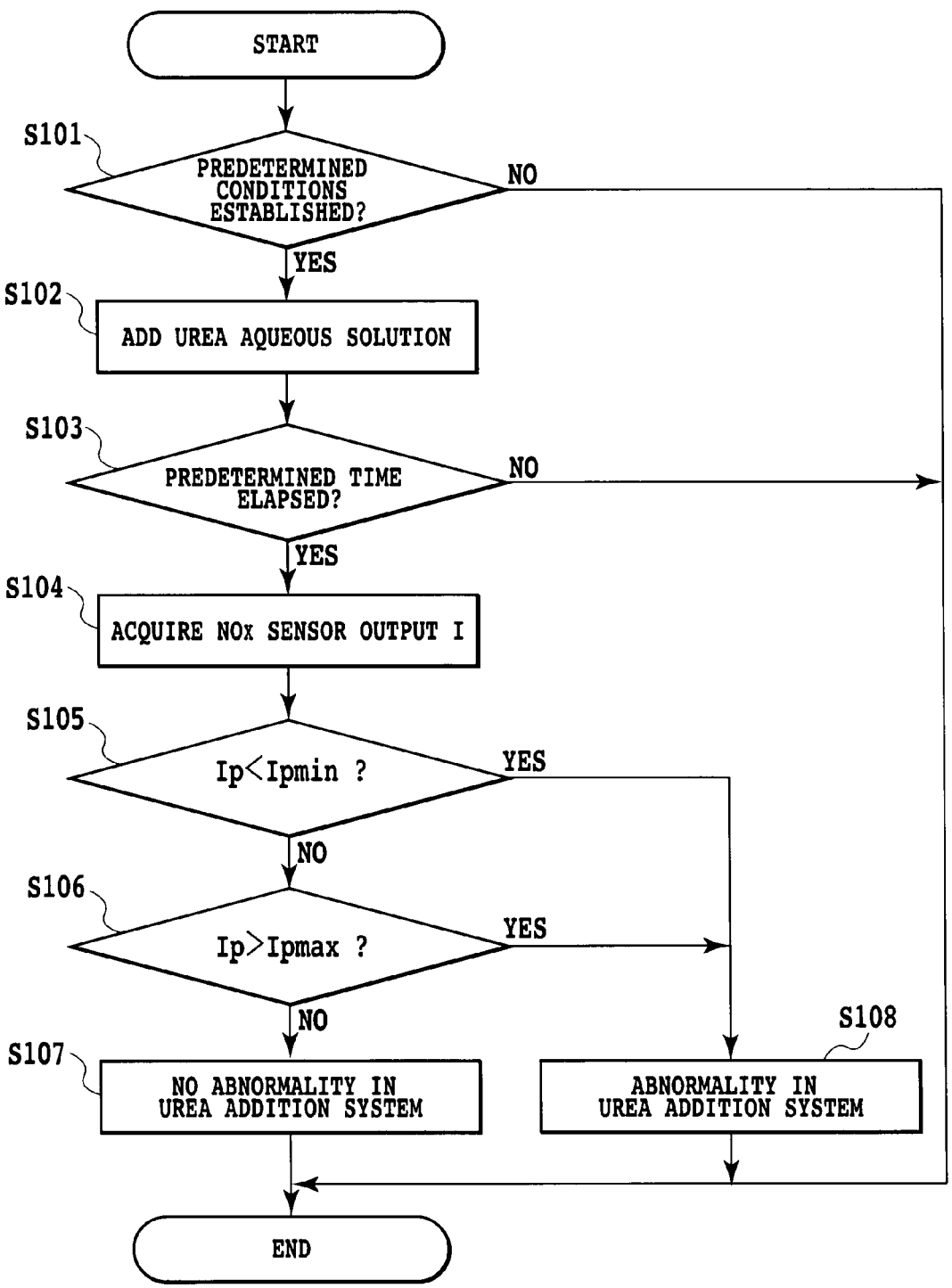
FIG. 3 is a flowchart showing one aspect of an abnormality diagnosis process.

Now, a specific abnormality diagnosis process will be described with reference to FIG. 3. The illustrated routine is repeatedly executed at predetermined micro time intervals (for example, 16 msec) by the ECU 100.

In the first step S101, the routine determines whether or not predetermined conditions suitable for the abnormality diagnosis have been established. The predetermined conditions are established when, for example, all of the following conditions are met: (a) Fuel cut is being performed, (b) the element temperature of the post-catalyst NOx sensor 50 is within the predetermined active region (that is, the post-catalyst NOx sensor 50 is active), and (c) an estimated catalyst temperature Tc is equal to or higher than a minimum active temperature Tcmin and lower than an upper limit temperature Tcmax (that is, the NOx catalyst 34 is within an operative temperature region). For (a), fuel cut is performed by the ECU 100 when the accelerator angle detected by the accelerator angle sensor 26 indicates a substantially full closed condition and when the rotation speed of the engine detected by the crank angle sensor 27 is slightly higher than a predetermined speed slightly larger than that for the idling condition. Besides (a), (b), and (c), the following condition may be used: (d) abnormality diagnosis has not been performed yet during the current trip.

If the predetermined conditions are determined not to have been established, the present routine is terminated. On the other hand, if the predetermined conditions are determined to have been established, then in step S102, the urea addition valve 40 is open for a preset on time $t_{on}$ (see FIG. 2) to allow a urea aqueous solution to be added.

In the next step S103, the routine determines whether or not the predetermined time $\Delta t$ has elapsed since the turn-on of the urea addition valve 40 (the start of addition of urea). If the routine determines that the predetermined time $\Delta t$ has not elapsed, the present routine is terminated. On the other hand, if the routine determines that the predetermined time $\Delta t$ has elapsed, then in step S104, an output value I from the post-catalyst NOx sensor 50 is acquired (monitored) for a predetermined time tm (see FIG. 2).

Figure 4:
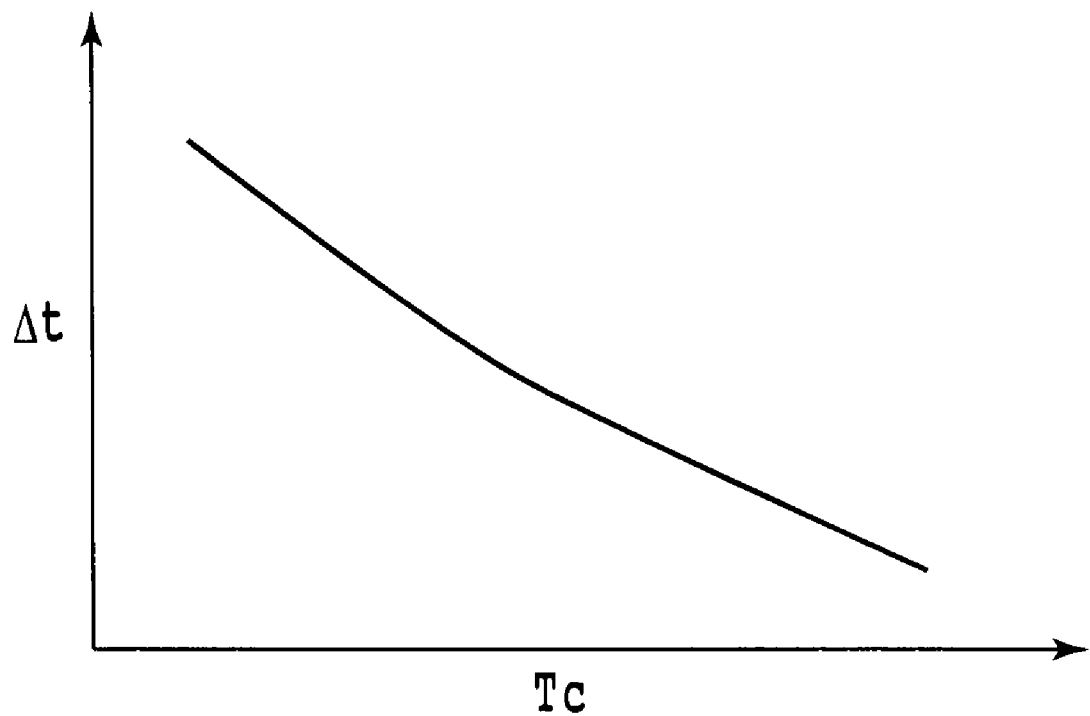
FIG. 4 is a map for setting a predetermined time.

As described above, monitoring a sensor output value I is started after the elapse of the predetermined time $\Delta t$ because it is necessary to wait for the reaction in the NOx catalyst 34 to complete; the reaction involves a change of urea ejected and fed from the urea addition valve 40 to ammonia mainly in the NOx catalyst 34 and the adsorption and desertion of ammonia in the NOx catalyst 34. In this case, the speed of the reaction depends on the catalyst temperature. Thus, in the present embodiment, for example, based on such a map as shown in FIG. 4, the predetermined time $\Delta t$ is set according to the catalyst temperature Tc. The predetermined time $\Delta t$ is reduced with increasing catalyst temperature Tc. This enables the appropriate wait time $\Delta t$ corresponding to the reaction speed in the NOx catalyst 34 to be set.

Then, in step S105, the peak value or maximum value Ip is determined from data on a plurality of the NO sensor output values I acquired. The peak value Ip is compared with a lower limit peak value Ipmin used to determine that the sensor output indicates an excessively small amount. If the peak value Ip is smaller than the lower limit peak value Ipmin, the routine proceeds to step S108 to determine that an abnormality is occurring in the urea addition system, that is, an abnormality is occurring in at least one of the urea addition device 48 and the urea aqueous solution. Simultaneously with the determination of the abnormality, a warning device such as a check lamp is actuated to warn the user of the abnormality. Then, the vehicle will be conveyed to a maintenance shop or the like, where the vehicle is subjected to required maintenance or repair.

On the other hand, if the peak value Ip is equal to or larger than the lower limit peak value Ipmin, the routine proceeds to step S106 to determine whether or not the sensor output indicates an excessively large amount. If the peak value Ip is larger than an upper limit peak value Ipmax, the routine proceeds to step S108 to determine that an abnormality is occurring as described above. On the other hand, if the peak value Ip is equal to or smaller than the upper limit peak value Ipmax, the routine proceeds to step S107 to determine that the urea addition system is normal, that is, both the urea addition device 48 and the urea aqueous solution are normal.

Here, the routine determines the urea addition system to be normal when the peak value Ip is within the predetermined normal range (equal to or larger than Ipmin and equal to or smaller than Ipmax). The routine determines that an abnormality is occurring in the urea addition system when the peak value Ip is out of the normal range (that is, within the abnormality range). However, instead of the peak value, the NOx sensor output integrated value SI obtained over a predetermined time tm may be used. In this case, the routine similarly determines the urea addition system to be normal when the integrated value SI is within a predetermined normal range (equal to or larger than SImin and equal to or smaller than SImax). The routine determines that an abnormality is occurring in the urea addition system when the integrated value SI is out of the normal range (that is, within the abnormality range). The upper and lower limit values (that is, the normal range) to be compared with the peak or integrated value may be changed according to a preset map or the like based on the urea addition amount (specifically, the on time $t_{on}$ of the urea addition valve 40).

Now, another aspect of the abnormality diagnosis will be described. The aspect of the abnormality diagnosis described above detects abnormalities in the urea addition system as a whole, and has difficulty distinguishing an abnormality in the urea addition device 48 and an abnormality in the urea aqueous solution, that is, distinguishing an abnormality in the addition amount of urea aqueous solution from an abnormality in the quality of the urea aqueous solution. Thus, to distinguish these abnormalities from each other, the present aspect includes another abnormality detection means for separately detecting abnormalities only in the urea addition device 48. Then, an abnormality is determined to be occurring in the urea aqueous solution when no abnormality is detected in the urea addition device 48 and when the output condition of the NOx sensor is within the predetermined abnormality range. This enables the above-described abnormalities to be distinguished from each other, allowing diagnosis accuracy to be improved.

The another abnormality detection means for detecting abnormalities only in the urea addition device 48 is, for example, as follows. That is, as shown by an imaginary line in FIG. 1, a pressure sensor 45 is provided which detects the pressure of the urea aqueous solution supplied to the urea addition valve 40. An output from the pressure sensor 45 is transmitted to the ECU 100. The pressure sensor 45 is provided in the supply line 41, connecting the urea supply pump 42 and the urea addition valve 40 together, and preferably as close to the urea addition valve 40 as possible. The ECU 100 detects abnormalities in the urea addition device 48 based on a decrease in the pressure of the urea aqueous solution detected by the pressure sensor 45 during ejection of the urea aqueous solution. If the urea supply pump 42 has a pressure sensor at an outlet portion thereof, this pressure sensor may be used in place of the pressure sensor 45.

Figure 5:
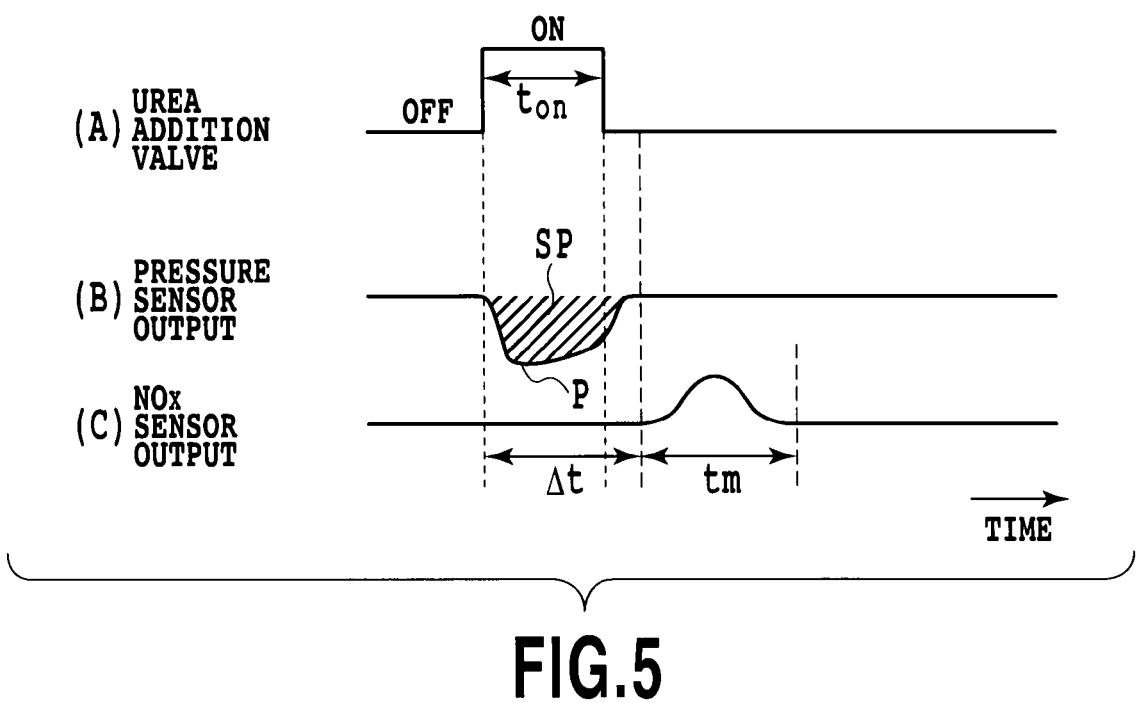
FIG. 5 is a time chart showing corresponding outputs from a pressure sensor and the post-catalyst NOx sensor obtained when the urea addition valve is turned on during fuel cut.

FIG. 5 shows corresponding outputs from the pressure sensor 45 and the NOx sensor 50 obtained when the urea addition valve 40 is turned on during fuel cut. As shown in (A), when the urea addition valve 40 remains on for a given time (valve open), the urea aqueous solution is correspondingly ejected from the urea addition valve 40. Thus, the supply pressure of the urea aqueous solution, that is, the line pressure of the supply line 41, decreases. The decrease in pressure is detected by the pressure sensor 45 and compared with a previously experimentally determined decrease in pressure observed when the urea addition device 48 is normal. Then, whether or not the urea addition device 48 is normal is determined.

If the urea addition device 48 is normal but the output from the post-catalyst NOx sensor 50 indicates an abnormality (which is indicative of an excessively large or small amount), the abnormality can be identified as one only caused by the abnormality in the quality of the urea aqueous solution. If an abnormality is occurring in the urea addition device 48 and the output from the post-catalyst NOx sensor 50 also indicates an abnormality, it is impossible to distinguishably determine whether the abnormality indicated by the output from the NOx sensor is due to an abnormality in the addition amount of the urea aqueous solution or an abnormality in the quality of the urea aqueous solution. Thus, in this case, it is determined that an abnormality is occurring in the urea addition system, that is, in at least one of the urea addition device 48 and the urea aqueous solution.

Figure 6:
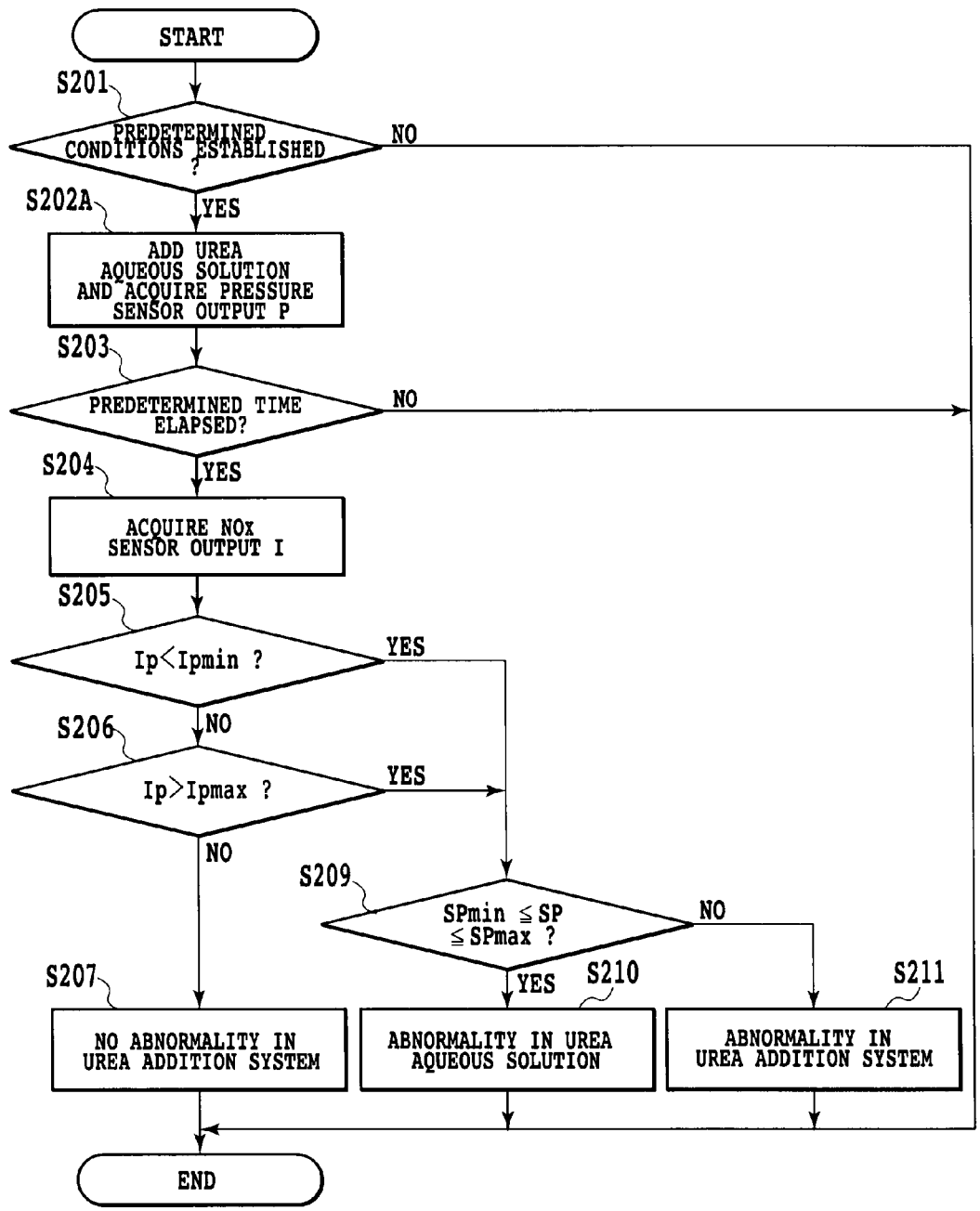
FIG. 6 is a flowchart showing another aspect of the abnormality diagnosis process.

The abnormality diagnosis process in the another aspect will be described with reference to FIG. 6. The process is almost similar to that shown in FIG. 3. In the following description, steps similar to those described above are denoted by reference numerals in the 200s. These steps are only shown in FIG. 6 and will not be described below. Differences from the process shown in FIG. 3 will be mainly described.

If in step S201, the predetermined conditions are determined to have been established, then in step S202A, the urea addition valve 40 remains on for the predetermined on time $t_{on}$ as in the case of the above-described step S102. At the same time, during the on time $t_{on}$, an output value P from the pressure sensor 45 is acquired (monitored) (see FIG. 2).

Subsequently, in steps S203 and S204, processing similar to that in the above-described steps S103 and S104 is executed. Then, if the peak value Ip of the NOx sensor output value I is determined to be smaller than the lower limit peak value Ipmin in step S205, or the peak value Ip is determined to be larger than the upper limit peak value Ipmax in step S206, the routine proceeds to step S209.

In step S209, a plurality of the pressure sensor output values P acquired in step S202A are integrated to calculate the integrated value SP (which corresponds to the size of a hatched area in FIG. 2). The routine then determines whether or not the integrated value SP is within the predetermined normal range, that is, whether or not the integrated value SP is equal to or larger than the predetermined lower limit value SPmin and equal to or smaller than the predetermined upper limit value SPmax.

If the integrated value SP is within the normal range, the urea addition device 48 is determined to be normal, and the output from the NOx sensor 50 indicating an excessively large or small amount is determined to be due to an abnormality in the quality of the urea aqueous solution. The routine proceeds to step S210 to finally determine that an abnormality is occurring in the urea aqueous solution.

If the integrated value SP is out of the normal range (that is, within the predetermine abnormality range), the urea addition device 48 is determined to be normal, and the output from the NOx sensor 50 indicating an excessively large or small amount is determined to be at least due to an abnormality in the addition amount of the urea aqueous solution and also possibly due to an abnormality in the quality of the urea aqueous solution. The routine proceeds to step S211 to finally determine that an abnormality is occurring in the urea addition system, that is, an abnormality in at least one of the urea addition device 48 and the urea aqueous solution. After the abnormality determinations, the warning device is actuated as described above.

In the present embodiment, an abnormality in the urea addition system is detected based on the output from the NOx sensor, located on the downstream side of the NOx catalysts, the output being obtained when urea is added during fuel cut. Thus, strictly speaking, an abnormality in the urea addition system cannot be accurately determined unless the normality of the NOx sensor is ensured. Thus, separate means for detecting abnormalities in the NOx sensor is preferably provided. In this case, for example, while the addition of urea is stopped, the NOx concentration is detected after the NOx catalyst by the NOx sensor and compared with that detected before the NOx catalyst. Thus, whether or not an abnormality is occurring in the NOx sensor is determined. The NOx concentration before the NOx catalyst may be detected by a separate NOx sensor or estimated based on the operation condition of the engine. While the addition of urea is stopped, the NOx catalyst is not operated, and the NOx concentration before the NOx catalyst should be equal to that after the NOx catalyst. Consequently, comparing the NOx concentrations with each other allows the suitable determination of whether or not the NOx sensor after the NOx catalyst is normal.

The embodiment of the present invention has been described. However, the present invention may include other embodiments. For example, the present invention is applicable to an internal combustion engine other than the compression ignition type, for example, a spark ignition type internal combustion engine, particularly a direct-injection lean-burn gasoline engine. In the above-described embodiment, the NOx sensor is used as a sensor detecting the ammonia concentration. However, obviously, any other sensor that can detect only the ammonia concentration may be used.

The embodiment of the present invention is not limited to the above-described one. The embodiment of the present invention includes any variations, applications, and equivalents embraced by the concept of the present invention defined by the claims. Thus, the present invention should not be limitedly interpreted but is applicable to any technique belonging to the scope of the concept of the present invention.

INDUSTRIAL APPLICABILITY

The present invention is applicable to an exhaust purification system that adds a urea aqueous solution as a reducing agent to an NOx catalyst of selective reduction type to reduce and remove NOx present in the exhaust gas.

The invention claimed is:
1. An abnormality diagnosis apparatus for an exhaust purification system comprising:
an NOx catalyst of selective reduction type provided in an exhaust passage in an internal combustion engine;

a urea addition device adding a urea aqueous solution to the NOx catalyst;
a sensor detecting an ammonia concentration of exhaust gas at a downstream side of the NOx catalyst;
fuel cut means for performing fuel cut in the internal combustion engine; and
abnormality detection means for detecting an abnormality in at least one of the urea addition device and the urea aqueous solution based on an output from the sensor obtained when the urea addition device adds a predetermined amount of urea aqueous solution during the fuel cut performed by the fuel cut means.

2. The abnormality diagnosis apparatus for the exhaust purification system according to claim 1, wherein the sensor comprises an NOx sensor capable of detecting both NOx concentration and ammonia concentration of the exhaust gas.

3. The abnormality diagnosis apparatus for the exhaust purification system according to claim 1, wherein the abnormality detection means detects an abnormality in at least one of the urea addition device and the urea aqueous solution based on at least one of a peak value and an integrated value of the sensor output.

4. The abnormality diagnosis apparatus for the exhaust purification system according to claim 1, further comprising a second abnormality detection means for detecting an abnormality only in the urea addition device, and
wherein said abnormality detection means determines that an abnormality is occurring in the urea aqueous solution when the second abnormality detection means has detected no abnormality in the urea addition device and when an output condition of the sensor is within a predetermined abnormality range.

5. The abnormality diagnosis apparatus for the exhaust purification system according to claim 4, wherein the urea addition device comprises a urea addition valve ejecting the urea aqueous solution into the exhaust passage, and
wherein the second abnormality detection means comprises a pressure sensor detecting pressure of the urea aqueous solution supplied to the urea addition valve, and determines that an abnormality is occurring in the urea addition device when a decrease in urea aqueous solution pressure detected by the pressure sensor during ejection of the urea aqueous solution by the urea addition valve is within a predetermined abnormality range.

* * * * *